Figure 1:
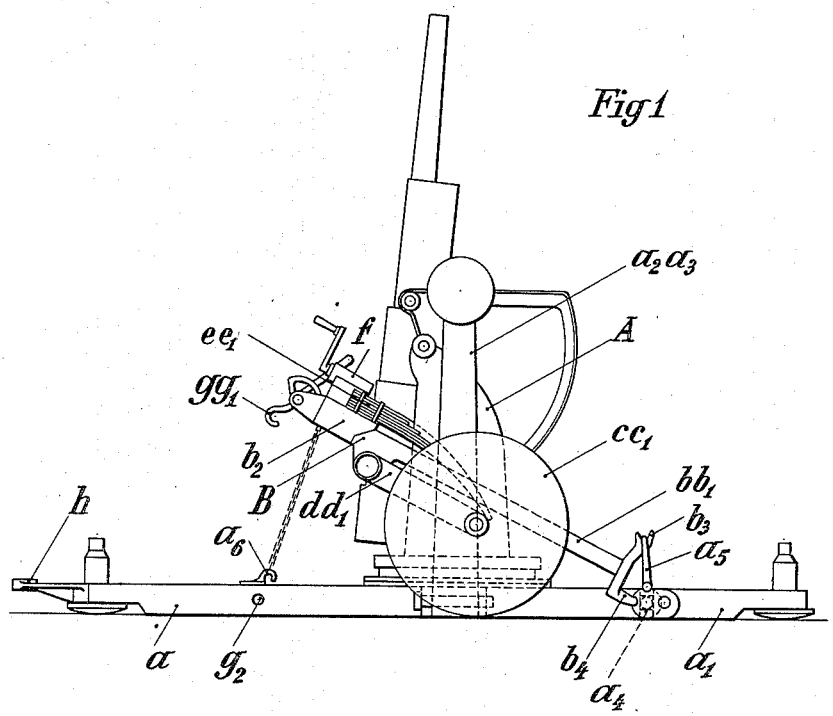

July 26, 1938.     A. KRUM     2,125,186
MEANS FOR TRANSPORTING GUNS
Filed Sept. 23, 1935     2 Sheets-Sheet 2

Inventor:
Alfred Krum
By
Attorney

UNITED STATES PATENT OFFICE 2,125,186

MEANS FOR TRANSPORTING GUNS

Alfred Krum, Dusseldorf-Eller, Germany, assignor to Rheinische Metallwaaren- und Maschinenfabrik, Dusseldorf-Derendorf, Germany, a corporation of Germany Application September 23, 1935, Serial No. 41,785
In Germany January 22, 1934

4 Claims. (Cl. 89—40)

This invention relates to carriages for guns adapted to be fired from a platform, of the kind which are arranged to be transported by means of a wheeled carriage comprising a longitudinal support resembling a balanced arm which also serves as a lever to raise or lower the gun platform.

It has already been proposed to use a single wheeled carriage with platform guns having a hinged pedestal, the carriage axle being coupled with a part of the platform which projects over the pedestal. In this case the pivoting of the gun pedestal is made use of to raise the platform on one side from the ground and draw it forward on to the wheeled carriage. The distribution of weight with regard to the axle, due to the pivoting of the pedestal, is such that a permissible limber pressure for attachment to a fore-carriage is obtained for the end of the platform which remains on the ground.

In the case of guns with a fixed pedestal on the platform two single axle wheeled carriages have always hitherto been necessary, with the result that the gun is turned into a double axled vehicle with the axles arranged one behind the other.

The invention makes it possible to transport platform guns with only one wheeled carriage even when the guns have a fixed pedestal.

This result is obtained according to the invention by employing a wheeled carriage having a longitudinal forked supporting member pivoted about the axle after the manner of a balanced beam, the supporting member being adapted, when the wheeled carriage is placed in position, to be coupled with the gun platform at a point lying behind the carriage by means of a double tilting movement about the axle.

The invention is illustrated by way of example in the accompanying drawings as applied to a gun mounted in a pedestal carriage carried on a cruciform platform.

In the drawings—

Figure 2:
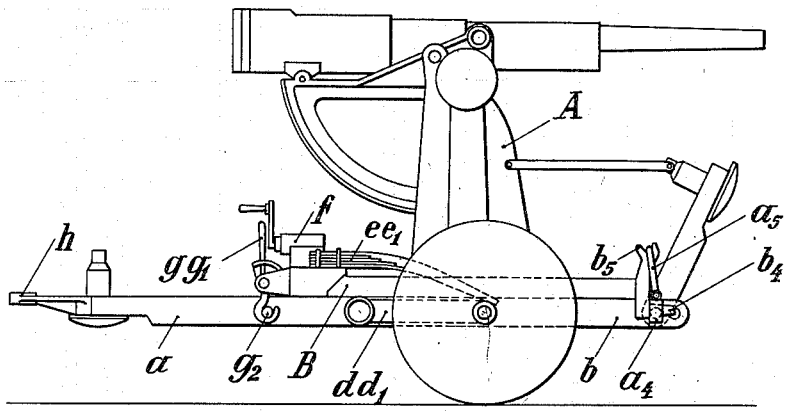
Figure 3:
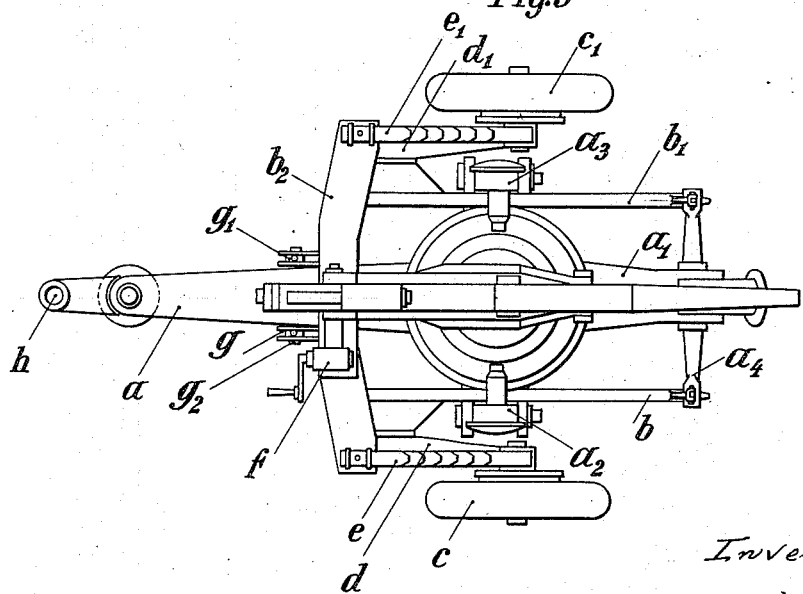

Fig. 1 is a side view showing the gun carriage with the transporting mechanism at the commencement of raising the gun on to the axle of the wheeled carriage; and Figs. 2 and 3 show in elevation and plan views respectively the gun raised on to the wheeled carriage ready for transport.

In the firing position the platform part A of the carriage with the pedestal which carries the barrel, has pairs of arms $a$, $a_1$ and $a_2$, $a_3$ forming a cross, outstretched on the ground. The transverse arms $a_2$, $a_3$ are hinged to the platform, and when the gun is to be moved are swung up into the position shown in Fig. 1; the fore and aft arms $a$, $a_1$ being fixedly attached to the base or platform part of the carriage.

The transporting or wheeled part B of the carriage consists of a forked frame having prongs $b$, $b_1$ and a cross bar $b_2$ (Fig. 3) which is carried by wheels $c$, $c_1$ which are supported on laterally swivelling crank levers $d$, $d_1$ disposed outside the prongs $b$, $b_1$ and supported for movement relative to the frame $b$, $b_1$, $b_2$ by springs $e$, $e_1$. This wheeled frame B has its wheels straddling the platform and can be shifted longitudinally thereof to permit the transverse arms $a_2$, $a_3$ to be raised and lowered.

The free ends of the prongs $b$, $b_1$ are provided with hook-like parts $b_3$ and conical guide members $b_4$ which, when preparing the gun for transport, engage with guides $a_4$ fixed to the arm $a_1$ and with stirrups or hooks $a_5$ carried on this arm.

The cross bar $b_2$ carries a rope or chain winch $f$ and the rope or chain is adapted to be connected to a hook $a_6$ fixed on the arm $a$. Locking members $g$, $g_1$ provided on the cross bar $b_2$ engage lugs $g_2$ on the arm $a$ in order to couple the wheeled carriage B and the gun carriage together in the transport position. The arm $a$ serves as a shaft for attachment to a tractor and is provided with a limber eye $h$.

When arranging the platform part A, which during firing tests on the ground, for transport, the two arms $a_2$, $a_3$ of the platform are swung up and the wheeled frame B with the prongs $b$, $b_1$ in front is moved so that the prongs $b$, $b_1$ and the wheels $c$, $c_1$ straddle not only the gun pedestal but also, if necessary, the arms $a_2$, $a_3$.

The wheeled frame is then tilted from the front about its axle. The hooks or stirrups $a_5$ engage with the parts $b_3$ and the rope or chain of the winch $f$ is looped into the hook $a_6$. The winch is then operated and the front or back end of the platform is raised from the ground according to whether the weight is thrown forwards or backwards. The platform then swings up about the end which remains on the ground and the guide members $b_4$ slide into the guides $a_4$. After being drawn up to the wheeled frame the platform is then locked to it by means of the members $g$, $g_1$, $g_2$.

When tilted into the horizontal position shown in Fig. 2 the weight of the gun, now made transportable, is so distributed with regard to the axle of the frame B that the whole carriage may be attached to a tractor by means of the limber eye $h$. By the reverse of the operations described the gun may again be brought into the firing position.

The springing of the wheels $c$, $c_1$ can, of course, be effected by means of leaf springs fastened to the axle and attached at both sides to the prongs of the forked frame. Such a springing arrangement is especially suitable for gun platforms having only three stretchers (i. e. arms such as $a$, $a_1$, $a_2$, $a_3$) of which one is fixed and the remaining two can swing horizontally about the platform. The wheeled frame in such case may be made very narrow and the adjustment of the stretchers may be made after the gun is arranged in the transport position.

I claim:

1. A gun mount comprising a platform and a pedestal fixed on the platform, a wheeled carriage for transporting the gun mount, said wheeled carriage comprising a forked frame straddling said pedestal and mounted above the platform, crank arms pivotally mounted on the frame, wheel axle units mounted on the crank arm adjacent the center of gravity of the mount, spring means between said frame and the wheel axle units, said platform having means for connecting it to and disconnecting it from the forked frame comprising coupling members on the platform forward of and to the rear of the pedestal and complementary coupling members therefor on the forked frame, and hoisting means mounted on one end of said forked frame and connected with said platform whereby said forked frame serves as a lever to raise and lower said gun mount.

2. A gun mount comprising a platform and a pedestal fixed on the platform, a wheeled carriage for transporting the gun mount, said wheeled carriage adapted to be removable from the gun mount, said carriage comprising a forked frame straddling said pedestal and attached to the platform, wheel axles which are at the center of gravity of the mount when transporting the gun mount, said platform having means for connecting it to and disconnecting it from the forked frame, said means comprising coupling members on the platform forward of and to the rear of the pedestal, and complementary coupling members therefor on the forked frame.

3. A gun mount comprising a platfrom and a pedestal fixed on the platform, a wheeled carriage for transporting the gun mount, said wheeled carriage comprising a forked frame straddling said pedestal and mounted above the platform, crank arms pivotally mounted on the frame, wheel axle units mounted on the crank arms adjacent the center of gravity of the mount, said platform having means for connecting it to and disconnecting it from the forked frame comprising coupling members on the platform forward of and to the rear of the pedestal and complementary coupling members therefor on the forked frame, and hoisting means mounted on one end of said forked frame and connected with said platform whereby said forked frame serves as a lever to raise and lower said gun mount.

4. A gun mount comprising a platform and a pedestal fixed on the platform, a wheeled carriage for transporting the gun mount, said wheeled carriage comprising a forked frame straddling said pedestal and mounted above the platform, crank arms pivotally mounted on the frame, wheel axle units mounted on the crank arms adjacent the center of gravity of the mount, said platform having means for connecting it to and disconnecting it from the forked frame comprising coupling members on the platform forward of and to the rear of the pedestal and complementary coupling members therefor on the forked frame, and means mounted on one end of said forked frame and connected with said platform whereby said forked frame serves as a lever to raise and lower said gun mount.

ALFRED KRUM.